United States Patent
Schaper et al.

(10) Patent No.: US 12,435,701 B2
(45) Date of Patent: Oct. 7, 2025

(54) METHOD FOR DETERMINING A BLADE MISPOSITION OF A ROTOR BLADE OF A ROTOR OF A WIND POWER INSTALLATION THROUGH AZIMUTHAL MOVEMENT

(71) Applicant: Wobben Properties GmbH, Aurich (DE)

(72) Inventors: Ulf Schaper, Staffhorst (DE); Wolfgang de Boer, Moormerland (DE); Dennis Gäbel, Meppen (DE); Rainer Kuhlemann, Westoverledingen (DE); Wenzel Laska, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 18/446,354

(22) Filed: Aug. 8, 2023

(65) Prior Publication Data

US 2024/0052811 A1     Feb. 15, 2024

(30) Foreign Application Priority Data

Aug. 9, 2022   (EP) .................................. 22189550

(51) Int. Cl.
   *F03D 17/00*   (2016.01)
(52) U.S. Cl.
   CPC ........ *F03D 17/029* (2023.08); *F05B 2260/83* (2013.01); *F05B 2270/328* (2013.01); *F05B 2270/329* (2013.01); *F05B 2270/802* (2013.01)
(58) Field of Classification Search
   CPC ...... F03D 17/029; F03D 17/00; F03D 7/0204; F03D 7/0224; F03D 7/024; F05B 2270/329
   See application file for complete search history.

(56) References Cited

U.S. PATENT DOCUMENTS

| | | | |
|---|---|---|---|
| 8,162,608 B2* | 4/2012 | Birkemose | F03D 7/0204 |
| | | | 416/37 |
| 8,683,688 B2* | 4/2014 | Axelsson | F03D 13/35 |
| | | | 29/889.3 |

(Continued)

FOREIGN PATENT DOCUMENTS

WO   WO 2016091254 A1   6/2016

OTHER PUBLICATIONS

Caselitz et al., "Rotor Condition Monitoring for Improved Operational Safety of Offshore Wind Energy Converters," *Journal of Solar Energy Engineering*, vol. 127, Transactions of the ASME, Copyright ASME 2005, XP008084934, pp. 253-261, May 2005.

*Primary Examiner* — Courtney D Heinle
*Assistant Examiner* — Wesley Le Fisher
(74) *Attorney, Agent, or Firm* — Seed Intellectual Property Law Group LLP

(57) ABSTRACT

A method for determining at least one blade misposition of a rotor blade of a rotor of a wind power installation having multiple rotor blades with an adjustable blade angle, wherein the blade misposition describes a blade angle variance of the blade angle of the rotor blade from a reference blade angle, the wind power installation has a nacelle having the rotor and an azimuth adjustment device, wherein a circumferential rotational position of the rotor is referred to as the rotor position, and the azimuth adjustment device has at least one activable azimuth actuator in order to adjust an azimuthal position of the nacelle, comprises the steps of a detection step comprising detecting an azimuthal movement of the nacelle while the at least one azimuth actuator is inactive, and a determination step comprising determining the blade misposition on the basis of the azimuthal movement detected in the detection step.

18 Claims, 4 Drawing Sheets

(56) References Cited

U.S. PATENT DOCUMENTS

| | | | | |
|---|---|---|---|---|
| 9,033,662 B2* | 5/2015 | Yoshida | ............... | F03D 7/0204 |
| | | | | 416/31 |
| 10,794,360 B2* | 10/2020 | Arlaban Gabeiras | ... | F03D 7/024 |
| 2009/0068013 A1* | 3/2009 | Birkemose | .............. | F03D 7/024 |
| | | | | 416/31 |
| 2010/0054939 A1* | 3/2010 | Hoffmann | ............... | F03D 7/043 |
| | | | | 290/44 |
| 2012/0230820 A1* | 9/2012 | Frydendal | ............. | F03D 7/0204 |
| | | | | 416/61 |
| 2015/0132129 A1* | 5/2015 | Atzler | .................. | F03D 7/0224 |
| | | | | 416/43 |
| 2016/0222944 A1* | 8/2016 | Stoltenjohannes | ... | F03D 7/0204 |

* cited by examiner

METHOD FOR DETERMINING A BLADE MISPOSITION OF A ROTOR BLADE OF A ROTOR OF A WIND POWER INSTALLATION THROUGH AZIMUTHAL MOVEMENT

BACKGROUND

Technical Field

Embodiments of the present invention relate to a method for determining at least one blade misposition of a rotor blade of a rotor of a wind power installation. Embodiments of the present invention also relate to a wind power installation in which such a method is implemented.

Description of the Related Art

Modern wind power installations have rotor blades that have an adjustable blade angle. This allows the blade angle to be adjusted to suit applicable operating situations, for example to rotate part of the rotor blades out of the wind at high wind speeds that are above a rated wind speed. The stronger the wind becomes, the further the rotor blades can be rotated out of it.

Particularly during operation under partial load, when the wind speed is below a rated wind speed, a wind power installation is frequently operated with a permanently set or at least permanently predefined blade angle. This is frequently based on a design that involves the wind power installation being operated with an optimum tip speed ratio.

It may happen that the three blades of a conventional wind power installation experience different blade loads. It may also happen that identical wind power installations, which should at least be the same, attain different power curves. Such power curves particularly denote operation under partial load. They reflect a relationship between a detected rotation speed and a power that is to be set. Alternatively, a torque curve that predefines a torque to be set on the basis of the rotor speed may also be relevant in this context.

It has therefore been recognized that if the three blades experience different blade loads, there could be a blade misposition. A blade misposition is understood to mean the state in which the three rotor blades have aerodynamically different placement. Their rotor blades are thus actually different from one another. At the same time, however, the control of the wind power installation assumes that all three blades are identically placed, that is to say pitched. The reason for this may be at an incorrectly set reference position, which can also be referred to as the zero position, for the blade angle encoder. A cause of this may be an incorrect procedure during construction of the wind power installation, for example.

There may thus be a situation in which the actual blade angles, at least of one rotor blade, are inconsistent with the value on which the control is based. The blade angle encoder, that is to say the measurement system, then outputs an incorrect blade angle that is altered by an offset, namely a blade misposition, compared with the actual blade angle.

Blade angle mispositions, similarly to mass imbalances, are sometimes also manifested in tower vibrations or power or rotation speed variations at the 1P frequency, that is to say the rotor revolution frequency.

Solutions are known for solving the problem, in particular for identifying the blade misposition also according to the absolute value as far as possible. It is known practice to measure the blade geometry using a tachymeter from a fixed position on the ground, and to compare it with a known blade geometry reference. This facilitates absolute blade angle adjustment. Any mass imbalances may thus not be taken into account, however. Such a measurement of the blade geometry has a high level of associated equipment outlay, however.

A measurement of the state of balance of wind power installations during operation by means of acceleration sensors or gyroscopes is also known. In particular longitudinal tower vibrations and tower torsions at the rotor revolution frequency are interpreted as an indication of blade angle mispositions in this case, while lateral tower vibrations may also be an indication of mass imbalances.

BRIEF SUMMARY

Some embodiments therefore address at least one of the aforementioned problems. In particular, some embodiments provide a solution to determine a blade misposition as efficiently as possible. Some embodiments provide an alternative to previously known solutions.

Some embodiments include a method for determining at least one blade misposition of a rotor blade, which can also be referred to synonymously as a blade angle misposition, of a rotor of a wind power installation having multiple rotor blades with an adjustable blade angle. Wind power installations normally have three rotor blades, and the present embodiments can be used to determine a blade misposition of one of these rotor blades.

The blade misposition describes a blade angle variance of the blade angle of the rotor blade from a reference blade angle. The blade misposition particularly describes a variance between an assumed blade angle and a blade angle that is actually present.

The wind power installation has a nacelle having the rotor and an azimuth adjustment device. An azimuth adjustment device can therefore change the azimuthal orientation of the rotor. In particular, a wind power installation may be designed such that the nacelle is mounted rotatably on a tower. In the region of the top of the tower, there may be provision for a circumferential ring gear. To adjust the nacelle, this can involve multiple azimuth motors each using a pinion to engage with the ring gear and thereby rotating the position of the nacelle.

Furthermore, a circumferential rotational position of the rotor, referred to as the rotor position, is taken into consideration. By way of example, a rotor blade of the rotor can be used as a reference position, in order to provide a clear explanation, and the position of this rotor blade during rotation of the rotor can then be understood as the rotor position.

Additionally, the azimuth adjustment device has at least one activable azimuth actuator in order to adjust an azimuthal position of the nacelle. The azimuth motors cited by way of example, which use pinions to engage with the cited ring gear, can each form such an azimuth actuator. In principle, a single azimuth actuator may suffice; when azimuth motors are the azimuth actuators there are frequently several used, for example four or six azimuth motors on each of two sides of the nacelle.

The proposed method comprises at least two steps, namely a detection step and a determination step.

The detection step comprises detecting an azimuthal movement of the nacelle while the at least one azimuth actuator is inactive. When the azimuth actuator is active, an azimuthal movement of the nacelle can be regularly detected, which is also useful for controlling the azimuthal movement, namely for azimuth adjustment. Here, however, it is proposed that the azimuthal movement of the nacelle also be detected when the azimuth actuator is inactive.

The determination step comprises determining the blade misposition on the basis of the azimuthal movement detected in the detection step. The azimuthal movement is thus detected despite the azimuth actuator being inactive, and the blade misposition is determined therefrom.

Here, it has particularly been recognized that despite the azimuth actuator being inactive and thus ultimately the azimuth adjustment device being inactive, there can still be an azimuthal movement. This can be triggered particularly, but not only, by the wind.

The following features may be implemented in one or more embodiments.

When the blades of a wind power installation pass through a wind field that changes only slowly over time, cyclic variations in the forces acting on the installation structure then occur, the frequency of which corresponds to the blade passage frequency (3P in the case of the three-bladed rotor) or a multiple thereof. Stimuli at the rotor revolution frequency (1P) do not arise while the three blades behave identically. This is the intended state of a wind power installation. At many other junctures it is assumed that this state is attained and adhered to, e.g., during component dimensioning during installation design, and also later during installation operation with optimum yield.

When for example one blade results in a blade angle misposition, this blade will produce more (or less) lift, and here also produce more (or less) resistance. Equally, a mass imbalance brings about an increase (or decrease) in centrifugal force. All of the cited effects can be modelled as an additional substitute force that engages with a constant point on the rotor. From the point of view of the nacelle, the point of engagement of this substitute force rotates with the rotor rotation, but will cyclically reach the same location again after one respective complete rotor revolution (1P).

The azimuth system may be observed in order to detect rotor imbalances. This exploits the fact that imbalanced force effects on the azimuth system of a wind power installation always re-occur at the same rotor position, resulting in a correlation between the rotor position and the observed change in the azimuth system.

In particular, small azimuthal movements are observed in this case that, due to play and flexibility in the azimuth drive system, also arise and are measurable for closed azimuth brakes.

The azimuth drive system is also a synonym for the azimuth adjustment device.

By way of illustration, a blade angle misposition by 0.3° for a single blade that has been rotated too greatly into the wind is considered. As a result, more lift than intended is produced. If this rotor blade is on the right-hand side of the nacelle, it will produce a force effect on the azimuth system that brings about a slight rotation to the right (through, e.g., $\frac{1}{100}°$). Only after this slight rotation to the right are the azimuth gears sufficiently braced for the azimuth brakes to be able to apply an opposing force. As soon as the rotor has rotated through 180°, the blade is on the left-hand side of the nacelle and brings about a rotation to the left of comparable amplitude.

A mass imbalance, e.g., of 1200 kg*m, would produce a comparable substitute force, the effective direction of which is within the rotor rotation plane, however. Said force has an equal effect on the azimuth system, the lever arm no longer being varied by the blade length, however, but rather by the distance from the azimuth rotation axis and rotor rotation plane.

This consideration of the azimuthal movement allows unbalances that fundamentally act in an axial direction to arise. Particularly uneven wind pressure on the rotor blades can therefore be reflected in an azimuthal movement. Insofar as azimuthal movements occur at a 3P frequency, that is to say three times per rotor revolution, they can be explained by the fact that a corresponding rotor has three rotor blades. Such movements can also occur without a blade misposition.

If there is a 1P frequency, however, then this is due to an unbalance in the rotor. A misposition of a rotor blade results in the latter experiencing a larger or smaller force, which also has an axial component, than the other rotor blades.

This different force is thus inferred from the azimuthal movement and a blade misposition is inferred from said force, for example by way of comparison tables.

Otherwise, such unbalances in the rotor caused by blade mispositions can also be referred to as aerodynamic imbalances.

According to one aspect, it is proposed that an azimuth locking brake has been operated in the detection step in order to prevent the azimuthal position from being adjusted. Here, it has particularly been recognized that a described azimuthal movement to determine the blade misposition can occur, and can be detected, even when the azimuth locking brake has been operated. The proposed method can thus particularly also be used for such azimuth adjustment devices that use such a locking brake. This is because it is basically possible to distinguish between two types or principles of azimuth adjustment devices. In one case, an azimuthal position is maintained by appropriate feedback control even if said position is currently not meant to be adjusted. In another case, an azimuth adjustment device works by operating the azimuth locking brake after every adjustment process in order to keep the nacelle in its azimuthal position by way of this brake. The proposed method according to one aspect is used for this second variant.

It has particularly been recognized in this case that an azimuthal movement when the azimuth locking brake has been operated is very small, however, and there may be a need for particular measures for evaluating a correspondingly small azimuthal movement in order to be able to infer the blade misposition therefrom. This will be explained more thoroughly below.

According to one aspect, it is proposed that a checking step comprises checking whether one, multiple or all detection prerequisites from the following list are met.

One detection prerequisite that the preceding checking step can be used to check for is whether the at least one azimuth actuator is inactive. The significance has already been explained above. Here, it is proposed that this is checked as a prerequisite before an azimuthal movement is recorded and is evaluated to determine the blade misposition.

Another possible detection prerequisite that can be checked beforehand is whether the azimuth locking brake has been operated. The effect and significance of the azimuth locking brake has been described above, and this aspect proposes checking whether the azimuth locking brake is active. This makes it possible to ensure that detected azimuthal movements cannot be attributed to adjustment activity.

Another detection prerequisite to be checked is whether a pitch device for adjusting the blade angles is inactive. Here too, it has been recognized that the detection of an azimuthal movement to determine the blade misposition should be performed while the blade angles of the rotor blades are not being adjusted, since otherwise at least distortion of the results can arise.

Another detection prerequisite to be checked can involve checking whether the rotor has at least one predeterminable minimum detection speed. A minimum detection speed such as this is preferably at least 25%, in particular at least 40%, of a rated speed of the rotor. Here, it has been recognized that a very slowly rotating rotor can result in an azimuthal movement that needs to be detected in order to determine a blade misposition turning out to be too slow or to have too small an amplitude. Here, there is the risk that measurement noise, or other disturbing influences, may be too dominant to still be able to reliably evaluate an azimuthal movement.

It is preferably proposed that all four detection prerequisites are checked before the detection step is performed. To this end, it is proposed that the detection and then subsequently the evaluation are performed only when all four detection prerequisites have been checked positively.

The checking step can precede the detection step. However, since there are regularly no constraints for detecting the rotor position and the azimuthal position, and possibly other variables, because this is performed for other evaluations or feedback controls in the wind power installation anyway, it is also initially possible for the detection of the azimuthal movement, that is to say an azimuth response, to be performed. If the detection prerequisites were met, the subsequent evaluation can be performed, otherwise the captured data, at least for determining the blade misposition, can be rejected.

According to one aspect, it is proposed that the azimuthal movement is detected by detecting an azimuth response dependent on the rotor position as the response of the azimuthal position, and characteristics of the azimuth response are used to determine the blade misposition. Here, it can particularly be expected that there is a sinusoidal azimuth response and its amplitude and phase, which both each form a characteristic of the azimuth response, can be used to determine the blade misposition.

The phase of such a response can particularly be used to infer to which of the rotor blades the azimuthal movement is ascribable. There is also the possibility here of said movement being able to be ascribed to multiple rotor blades. There is also the possibility of two sinusoidal responses being overlaid in the azimuth response if multiple rotor blades have a blade misposition and these are in particular different from one another.

The amplitude of the response can be used to infer the size of the blade adjustment.

The amplitude and phase of such a sinusoidal response of the azimuth response of one specific or multiple specific blade mispositions can be used for ascribing by way of appropriately previously recorded tables or a previously recorded table containing an appropriate number of entries.

Such comparison tables can deliberately be recorded in a wind power installation in which there is no blade misposition. For test purposes, a rotor blade, or multiple rotor blades, can deliberately be put into a blade misposition in order to thereby produce such a reference table. It is also possible to test multiple blade mispositions, in particular even blade mispositions having different amplitude.

According to one aspect, it is proposed that the azimuthal movement is detected by recording an azimuth response as the response of the azimuthal position over a rotor position response as the response of the rotor position, and the blade misposition is determined by evaluating the azimuth response on the basis of the rotor position response.

Such an evaluation of the azimuth response on the basis of the rotor position response may fundamentally also already have been the basis for the previous aspect, wherein characteristics of the azimuth response are used to determine the blade misposition. Such characteristics may particularly have been determined from the azimuth response on the basis of the rotor position response. In particular, a sinusoidal response can be expected for the azimuth response with regard to the rotor position response. The azimuth response then has a sinusoidal oscillation or sine wave over one rotor revolution. The period length of the expected sinusoidal response therefore corresponds to one rotor revolution.

This and the aspects that follow are based particularly on the insight that the recorded azimuth response, specifically wherein the azimuth actuator, that is to say in particular the azimuth adjustment device, is inactive, has only a very small amplitude. It may be overlaid with very high levels of noise and/or other interference. This is also based on the insight that a measuring device used, specifically the measuring device that is also used for operating the azimuth adjustment device, is not designed to record such small azimuthal movements. This can lead to these small azimuthal movements being resolved only very inaccurately.

As a result of the azimuth response being evaluated on the basis of the rotor position response, a correlation between these two responses is produced. This allows the individual values of the azimuth response to be ascribed to specific values of the rotor position response and therefore subjected to better further processing.

According to one aspect, it is proposed that the azimuth response is used to compute a 1P component, wherein the 1P component describes an oscillating signal with a period over one rotor revolution, and the 1P component is taken as a basis for determining the blade misposition. In particular, the 1P component is computed using an amplitude and a phase related to the rotor position.

This is therefore also based on the azimuth response on the basis of the rotor position response, and so here too the correlation between the azimuth response and the rotor position response is formed and used further. It is therefore assumed that the azimuth response is a sinusoidal response with a period length that corresponds to one rotor revolution. The azimuthal movement thus performs a sinusoidal response per rotor revolution.

This is therefore also based on the concept that the azimuth response has only a small signal amplitude given a comparatively high level of noise and very poor resolution. The assumption of a 1P component, that is to say a sinusoidal response with a period over one rotor revolution, allows this 1P component, that is to say the sinusoidal signal, to be determined according to phase and amplitude in such a way that this sine response corresponds to the very noisy azimuth response as well as possible. Stated in clear terms, the sinusoidal signal is therefore disposed such that variances between the sinusoidal signal and the recorded azimuth response are as small as possible.

One way of determining the 1P component, that is to say the sinusoidal signal, according to amplitude and phase is using a Fourier analysis. Preferably, a DFT (discrete Fourier transformation) is used.

Fourier transformations and in particular a DFT are well known. However, this involves determining only the fundamental wave. Moreover, this is based on the insight that a sinusoidal signal is expected for the azimuth response.

These considerations can therefore be used to predefine the response that can be expected as a sinusoidal signal, which therefore has no noise, only the amplitude and phase of the sinusoidal signal needing to be determined. This then inevitably results in a noiseless signal, which again can continue to be evaluated very well in order to determine the blade misposition. Here too, this can be accomplished using appropriate reference tables, as already described above for a different aspect.

According to one aspect, it is proposed that the recorded azimuth response is evaluated by recording an integral over the azimuth response, in particular over half of one rotor revolution, and that the integral is used to determine an amplitude of an assumed sinusoidal azimuth response, in particular with an assumed period length over one rotor revolution.

Here, it has particularly been recognized that the integration over half of one period length allows an amplitude of the integrated sine response to be effectively determined despite a very noisy signal. The amplitude of the integrated signal and therefore the amplitude of the inferred sinusoidal signal are therefore known from the integral of the half-cycle, or can be computed therefrom using a conversion factor.

The integration over one half-cycle allows the sharp variations in the values of the azimuth response and the high level of noise to be effectively averaged out. It has also been recognized here that the integration, in the digital case that is to say addition, means that a very poor resolution or very coarse discretization of the azimuth response results in fewer problems. It has particularly been recognized that the variances in the individual values of the azimuth response from the ideal response over the half-cycle are approximately 0 on average, meaning that the integral formation allows a good value to be determined.

One way of determining the 1P component, that is to say the sinusoidal signal, according to amplitude and phase can therefore be to use the integration described. The phase can be inferred from a zero crossing of the integrated signal, a shift through 90° needing to be taken into account owing to the integral formation.

However, it is also possible to place the integration upstream of determination of the 1P component using a Fourier analysis. A DFT (discrete Fourier transformation) can preferably be used in that case too.

According to one aspect, it is proposed that the azimuth response is recorded over multiple rotor revolutions, preferably over at least 10 revolutions, in particular over at least 1000 revolutions. To this end, it is proposed that the azimuth response is used to compute an averaged azimuth response for one rotor revolution. This involves averaging or otherwise filtering, for each rotor position, all respective values of the orientation response that have been recorded for this rotor position.

Here too, it is therefore possible to exploit the correlation between the azimuth response and the rotor position response. As a result of the very low resolution of the values of the azimuth response, or as a result of overlaid noise and overlaid interference, a single value of the azimuth response has only very little significance. The fact that the expected sinusoidal signal, in particular the 1P component, correlates precisely with one rotor revolution means that the same azimuth response can basically be recorded for every revolution. The repetition with many revolutions allows an average to be calculated for any rotor position for which a value of the azimuth response is recorded. Preferably at least 10 revolutions, but in particular also very many revolutions, such as at least 1000 revolutions, can be performed here. In the case of 1000 revolutions, for example, a mean value is thus obtained over 1000 values, which can therefore be very good averaging.

Here, it has been recognized that, even despite the problem of low resolution, no systematic error is to be expected for the averaging of the values of a respective rotor position. In principle, although a low resolution, that is to say low discretization, can regularly lead to a systematic error, which regularly cannot be corrected by averaging, such a problem does not usually arise in the present case. This is because although the azimuth response fundamentally repeats with every rotor revolution, its amplitude varies somewhat, which is due to the wind usually never being exactly constant. These at least small variations result in an even statistical distribution being able to be expected for the values of each rotor position despite low resolution.

Instead of the averaging preferred here, other filtering can also be performed, for example by routing the values of the azimuth response for a respective rotor position via a first-order delay element (PT1 element) in order to smooth them, that is to say filter them, as a result. The use of a first-order delay element has the advantage that more up-to-date values have a greater influence than older values. The result is thus more up to date and therefore better matched to the prevailing wind speed, should this have changed somewhat during measurement collection.

According to one aspect, it is proposed that azimuthal values as rotor-position-dependent values of the detected azimuthal movement are used to determine the at least one blade misposition by way of comparison with azimuthal values recorded in preliminary investigations. In particular, it is proposed that respectively blade misposition values of the rotor blades are stored in a table for the amplitude and phase of a 1P component inferred from the detected azimuthal movement or from the azimuth response.

Preliminary investigations can be carried out, as already described above, by way of actual trial runs of the wind power installation by purposefully setting blade mispositions in order to observe a resulting azimuthal movement on the basis thereof. However, there is also the possibility of the necessary relationships having been recorded in a simulation.

It is particularly proposed that a 1P component is used, as already described above. Such a 1P component, which therefore forms a sinusoidal response having a period length corresponding to one rotor revolution, can be characterized by its amplitude and its phase. The phase is therefore associated with a rotor position. The phase can be understood here as meaning that a zero crossing of the sinusoidal response of the 1P component is ascribed to a rotor position. Other variants are also possible, e.g., the rotor position for which the maximum amplitude occurs being recorded as the phase or as the equivalent to the phase.

A two-dimensional table can then store the amplitude, on one hand, and the phase, on the other, that is to say rotor positions. The phase, that is to say rotor position, allows conclusions about which rotor blade has the blade misposition. By way of example, the azimuth response can have a maximum at one rotor position, in which for example a first of three rotor blades projects transversely, e.g., in a 9 o'clock position. In this case, the 9 o'clock position can be entered as the rotor position or phase in the table and it can be inferred from this that the blade misposition can be ascribed to the first rotor blade cited by way of illustration. From the amplitude, it is possible to infer how great the blade misposition is.

It is also advisable to use such a table for the amplitude, since it has been recognized that nonlinear relationships can exist between the amplitude of the azimuth response and the blade misposition. The reason for this is particularly that the flexibility of the azimuth adjustment device can be attributed not only to an elasticity but also to at least one gear slack. Accordingly, the relationships between the amplitude of the azimuth response and the blade misposition can already therefore be expected to be nonlinear. Other nonlinearities can ensue. The use of a table is appropriate even for negligible relationships, however, particularly in order to interpolate or extrapolate from values stored in the table to others.

According to another example, in order to modify the above example somewhat, it is assumed that an 11 o'clock position has been identified as the phase or rotor position. If the maximum deflection is at the 11 o'clock position while a first rotor blade is in the 9 o'clock position, a second rotor blade is in the 1 o'clock position. The 11 o'clock position now identified as a maximum is therefore directly central between these first and second rotor blades. This can mean that the azimuth adjustment is present in the third rotor blade, but with a negative arithmetic sign, or that the first and second rotor blades both have a blade misposition. The result can also be used by service personnel to investigate the underlying error in more detail.

According to one aspect, it is proposed that the azimuth adjustment device has a transmission having a gear elasticity for adjusting the nacelle, wherein the transmission is arranged between a pinion, on the one hand, which engages with a ring gear, and the azimuth actuator and/or a or the azimuth brake, on the other hand, with the result that the gear elasticity permits the detected azimuthal movement when the azimuth actuator is inactive or when the azimuth brake has been operated. Additionally or alternatively, there can be provision for a gear slack between the pinion and the ring gear.

Here, particular use is therefore made of the fact that between the azimuth actuator, that is to say in particular an azimuth motor, and the pinion there is a transmission that is not infinitely stiff. Such a transmission translates in particular from a high speed of the azimuth motor to a very slow speed of the pinion. This gear elasticity between the drive motor and the pinion permits a small movement despite the inactive azimuth actuator, that is to say the inactive azimuth motor. This resultant permitted movement can be detected as an azimuthal movement.

The transmission can also include a gear slack.

The azimuth brake can be mounted in particular on the azimuth actuator, that is to say the azimuth motor. In particular, it can slow the drive motor directly, or a transmission element that the drive motor also accesses. As a result, the transmission, which can also be referred to as the azimuth gear, is also arranged between the azimuth brake and the pinion, and so the gear elasticity permits the azimuthal movement even when the azimuth brake is locked.

Additionally or alternatively, there can be provision for a gear slack between the pinion and the ring gear. This can also be understood as part of the transmission. If it is understood separately, it can permit an azimuthal movement in addition to the transmission.

It has thus been recognized that particularly such a gear elasticity and/or gear slack in that area permits an azimuthal movement despite the inactive azimuth adjustment and thereby facilitates an evaluation of the azimuthal movement in this situation, in order to determine the blade adjustment angle as a result.

According to one aspect, it is proposed that at least the detection step and the determination step are each repeated after a predetermined waiting period and/or another predefinable event in order to verify a possible change in the determined blade misposition, wherein in particular the predetermined waiting period is at least one month, in particular at least half a year.

Here, it has particularly been recognized that the proposed method according to all of the proposed aspects is not only suitable for detecting an initial blade misposition. Such an initial blade misposition can occur particularly during construction of the wind power installation and can be corrected using the method. More than this, however, it has been recognized that the proposed method requires no kind of additional operative setup and can therefore be performed again for testing purposes after an appropriate waiting period, that is to say in particular after one month or after half a year, or after one year.

It has particularly been recognized that the method can be carried out during ongoing operation. Although it is preferably verified whether specific detection prerequisites exist, this does not mean that such prerequisites are purposefully set. Rather, it is possible to wait until such detection prerequisites establish themselves of their own accord during ongoing operation. The method for determining the blade misposition can then fundamentally run in the background and any errors that have arisen in the interim can be detected.

By way of example, a blade misposition can occur after maintenance, to cite just one example. Accordingly, the maintenance can be another predefined event. A blade replacement can also be another predefined event, for example, after which the method for determining a blade misposition, in particular the detection step and the determination step, is repeated.

A wind power installation may be ready to determine at least one blade misposition of a rotor blade of a rotor of the wind power installation, the rotor having multiple rotor blades with an adjustable blade angle, wherein the blade misposition describes a blade angle variance of the blade angle of the rotor blade from a reference blade angle, the wind power installation has a nacelle having the rotor and an azimuth adjustment device, wherein a circumferential rotational position of the rotor is referred to as the rotor position, and the azimuth adjustment device has at least one activable azimuth actuator in order to adjust an azimuthal position of the nacelle, wherein the wind power installation has a detection device in order to use a detection step to detect an azimuthal movement of the nacelle while the at least one azimuth actuator is inactive, and has a computing unit in order to use a determination step to determine the blade misposition on the basis of the azimuthal movement detected in the detection step.

The wind power installation therefore has a detection device that is or contains in particular a sensor for measuring the azimuthal movement. The computing unit can in particular be a process computer arranged in the wind power installation.

According to one aspect, the wind power installation has a control unit and is ready to carry out a method according to one of the aspects of the method for determining a blade misposition that have been explained above. To this end, the method can particularly be implemented in the control unit. The detection device can be part of the control unit and/or both can be part of a process computer on which the method can also be implemented. The method can particularly be implemented as a computer program on the process computer.

BRIEF DESCRIPTION OF THE SEVERAL VIEWS OF THE DRAWINGS

Some embodiments are explained more thoroughly below by way of example with reference to the accompanying figures.

DETAILED DESCRIPTION

Figure 1:
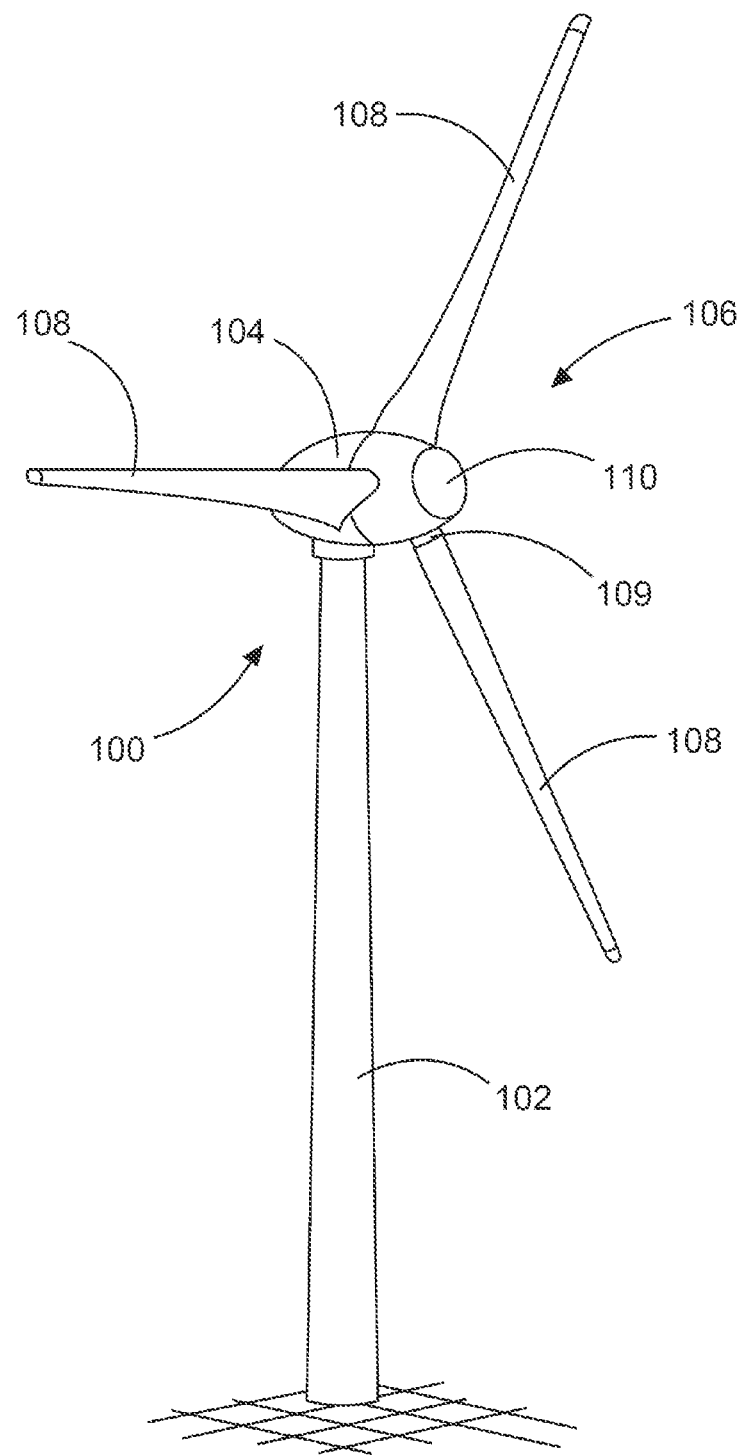
FIG. 1 shows a schematic illustration of a wind power installation.

FIG. 1 shows a schematic illustration of a wind power installation. The wind power installation 100 has a tower 102 and a nacelle 104 on the tower 102. The nacelle 104 has an aerodynamic rotor 106 provided on it, having three rotor blades 108 and a spinner 110. The aerodynamic rotor 106 is set in a rotary motion by the wind during operation of the wind power installation and thereby also rotates an electrodynamic rotor of a generator that is coupled directly or indirectly to the aerodynamic rotor 106. The electric generator is arranged in the nacelle 104 and generates electrical energy. The pitch angles of the rotor blades 108 can be altered by pitch motors at the rotor blade roots 109 of the respective rotor blades 108.

Figure 2A:
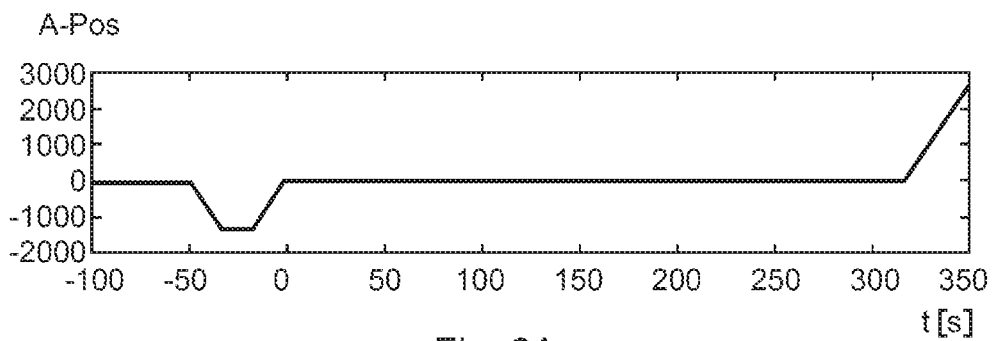
FIG. 2A shows a temporal response of an azimuthal position over time.

FIGS. 2A to 3B illustrate and explain an example in which a blade angle error, that is to say a blade misposition, of 0.3° has occurred at a rotor blade. First, consideration is given to a measured azimuth angle, that is to say the azimuthal position, in a measurement period lasting several minutes during operation of the wind power installation, which can also be referred to as the installation to simplify matters. This is shown by FIG. 2A.

FIG. 2A therefore shows the response of the azimuthal position, that is to say the response of the azimuth angle, over a measurement period lasting several minutes, here specifically 450 s. The time is thus plotted on the abscissa and the azimuth angle is plotted on the ordinate, the underlying unit being the resolution of the encoder signal, specifically in that the encoder signal can resolve to the value 1, with the result that the encoder signal can thus output only whole numbers.

With this extremely small unit 1 of the encoder signal, the value 1000 corresponds to an azimuth angle with a few degrees.

The set azimuth angle at the beginning of the measurement period can be taken as a reference value and defined as the value 0. On the basis of this, it can be seen that alignments to track the wind take place for t=−50 to t=0 and from t=320 s onward.

No alignments to track the wind take place in the range from t=0 s to t=320 s, therefore, and it also seems that no movement at all occurs in the azimuth system.

Figure 2B:
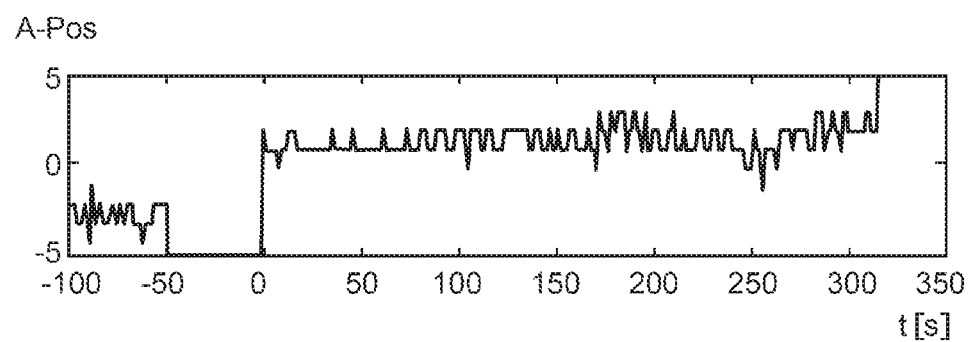
FIG. 2B shows the response of the azimuthal position in FIG. 2A at a higher resolution.

The range from t=0 to t=320 s has very high resolution in FIG. 2B, that is to say is very highly magnified in the direction of the ordinate. In FIG. 2A, the values on the ordinate extend from −2000 to +3000. In FIG. 2B, the values extend from −5 to +5. No alignment to track the wind, that is to say no azimuth adjustment, takes place in the range from t=0 to t=320 s, and in principle it is thus possible for an evaluation of the response of the azimuth position to be performed in this range in order to detect a blade misposition.

To this end, there is a proposal to additionally check criteria, specifically, in addition to no azimuth adjustment taking place, that is to say that the azimuth actuator is inactive, to check whether the locking brake has been operated, a pitch device for adjusting the blade angles is inactive and the rotor has at least one predetermined minimum detection speed. In the example shown, it has been recognized that these criteria are met.

Thus, an evaluation, specifically a detection of the imbalance, is possible for several minutes from the time t=0 to the onset of the next alignment to track the wind. Here, there was constantly a high rotor speed for this period and the pitch system, that is to say an adjustment device for adjusting the blade angle, remained unused.

In the illustration in FIG. 2B at the high resolution, it can also be seen that the shape of the signal, that is to say the shape of the recorded response of the azimuthal position, is determined by the resolution to the value 1. Most changes that can be seen in the range between t=0 and t=320 s are step changes around the value of the lowest resolution.

Figure 2C:
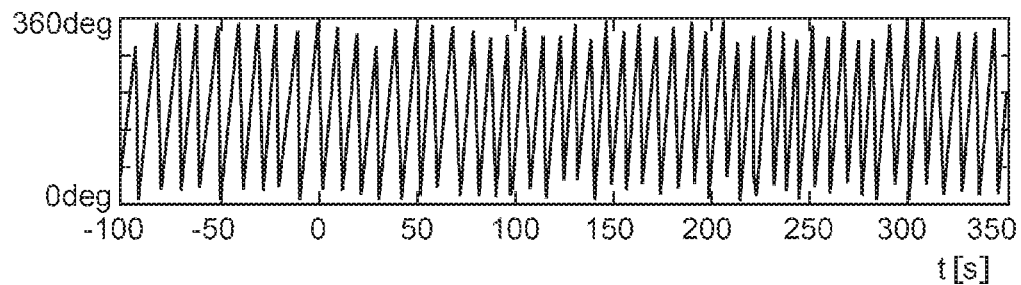
FIG. 2C shows a response of a rotor position over the same time as in FIGS. 2A and 2B.

FIG. 2C shows a rotor position, that is to say its temporal response, over the same period that is also considered in FIGS. 2A and 2B. It has been recognized that, compared with the graphs shown in FIG. 2B and FIG. 2C, the apparently random changes in the movement of the azimuth system occur at a similar frequency to the rotor revolutions shown in FIG. 2C. It is therefore proposed that these values be processed even further for the purpose of better evaluation.

Figure 3A:
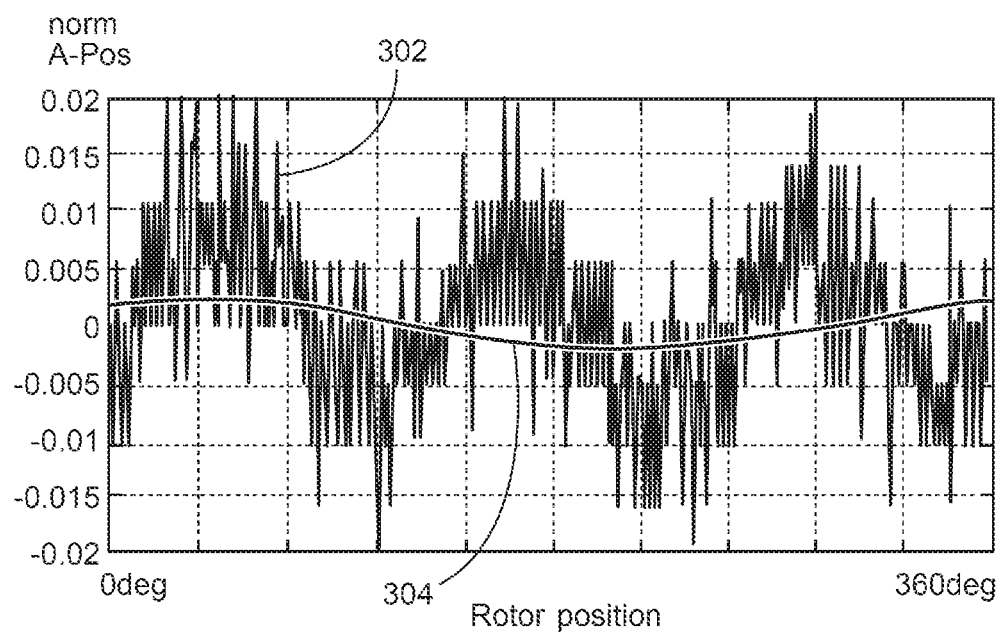
FIG. 3A shows a response of the azimuthal position over one rotor revolution.

The following has been recognized:

If the rotor positions at which changes in the whole azimuth angle occur are recorded over a period lasting several hours, the result, following normalization with the number of rotor revolutions, is the graph shown in FIG. 3A.

FIG. 3A shows a very noisy measurement signal 302 that has a frequency of three times the rotor speed, or in which a strong 3P component is visible. This means that at three marked rotor positions the nacelle tends to be rotated to the right, whereas it tends to be rotated to the left at three rotor positions in between. Such a 3P component is produced by a horizontal wind shear and can be expected even without a rotor imbalance.

The data shown can also be used to compute a 1P signal component 304, however. The 1P signal component 304 is therefore a signal at the same frequency as the rotor speed. It thus has a cyclic, in particular sinusoidal, response with a period length that corresponds to one revolution of the rotor.

This 1P signal component 304 is already shown in FIG. 3A, but its computation will be explained below. In any case, it has been recognized that the data shown can be used to compute this 1P signal component 304 as shown in FIG. 3A.

It can thus be seen that a 1P signal component, specifically the 1P signal component 304, is also included, at least to a small extent. This 1P signal component suggests a rotor imbalance, specifically in particular an aerodynamic rotor imbalance.

It is proposed that the recording of such azimuthal values while no azimuth adjustment is carried out be continued over a longer period. It has been recognized that this results in some influences from the wind field being averaged out. This relates in particular to a horizontal wind shear. Such a wind shear results in uneven loading of the rotor, which means that—stated in clear terms—at one position in the rotor field there is a higher loading that in each case affects the rotor blade passing through there. When there are three rotor blades, a 3P component is thus obtained that can be seen in the measurement signal 302. Such a wind shear, or another effect due to not completely homogeneous wind, changes, however, which means that the local loading also shifts, and the 3P signal component that can be seen thus also changes. It has been recognized that such effects are thus averaged out when averaging over a longer period.

Figure 3B:
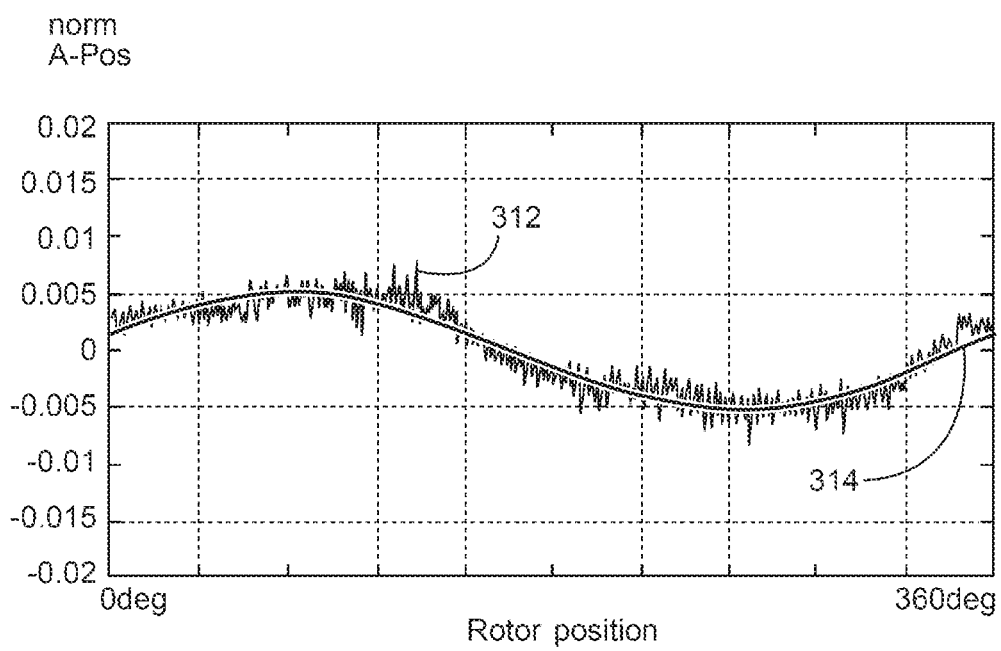
FIG. 3B shows a filtered response of the azimuthal position over one revolution based on a measurement recording over many revolutions.

After such averaging, a signal response that has a significant 1P component is then basically also left over in the normalized raw data shown in FIGS. 3A and 3B. Said signal response is shown as an averaged signal response 312 in FIG. 3B. This averaged signal response 312, that is to say the response of the azimuthal position, is averaged in such a way that the values that have been recorded for the same rotor position are averaged in each case.

The result is therefore this averaged signal response 312, which appears as a noisy signal response, not all variations necessarily being attributable to noise. It is proposed that this be used to compute a 1P component, which is shown as the 1P signal component 314 in FIG. 2B. This corresponds to the 1P signal component 304 in FIG. 3A. Computation is performed such that the 1P component is predefined with the period length corresponding to one rotor revolution, the amplitude and phase being computed such that the 1P signal component 314 models the averaged signal response 312 as well as possible.

The computation can be performed using a DFT. There is also the possibility of optimizing the amplitude and phase using a Gaussian method in order to minimize variances between the 1P signal component 314 and the averaged signal response 312.

The blade misposition can then be inferred from the 1P component thus determined, this being able to be performed as follows. A rotor imbalance is determined to this end by way of comparisons of the discovered, that is to say computed, amplitude of the 1P component with known references. Such a reference can be formed by setting an imbalance that is just about tolerable on a prototype of a wind power installation and determining the resultant 1P component, which can also be referred to as a 1P curve. Other experiments using an even smaller imbalance than the tolerable imbalance can also be performed. The cited imbalance can be understood to mean in particular an aerodynamic imbalance that is set by producing a blade misposition.

Figure 4:
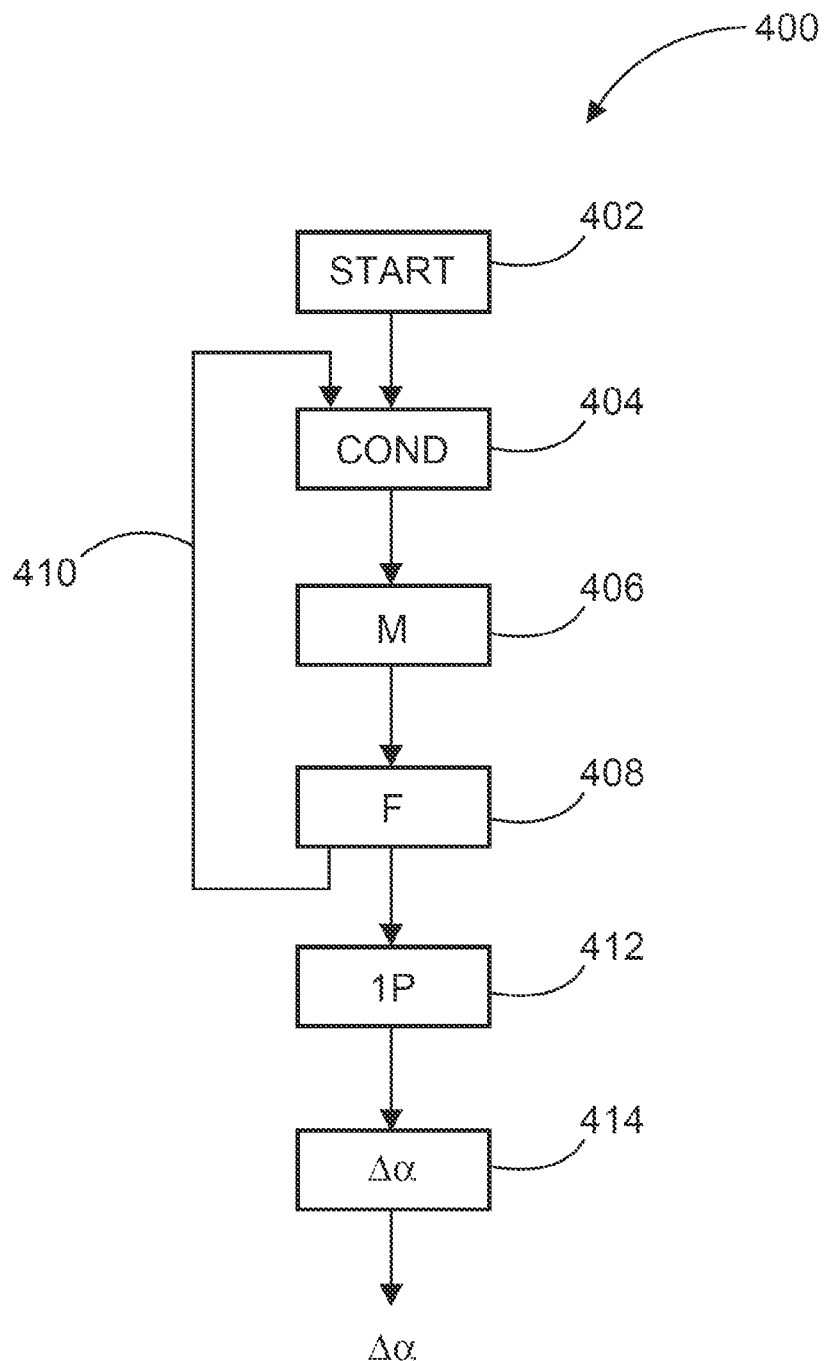
FIG. 4 shows a simplified flowchart for a proposed method for determining a blade misposition.

FIG. 4 explains the proposed method on the basis of a flowchart 400. In a starting step 402, the method is started. The starting step 402 can be triggered by a time, for example every half a year, or by an event, such as the completion of the wind power installation following its construction. Other events such as a blade replacement can also trigger the starting step 402.

A checking step 404 comprises checking conditions that are supposed to be underlying when detection of the azimuthal movement, in particular detection of an azimuthal position response, with subsequent evaluation to determine the blade misposition is meant to be performed. The checking step 404 can particularly comprise checking whether an azimuth actuator is inactive, an azimuth locking brake has been operated, a pitch device is inactive and the rotor has at least one predeterminable minimum detection speed.

If all of these conditions are met, the method continues, following the checking step 404, in the detection step 406. The detection step comprises recording an azimuthal position response, and at the same time recording a rotor position response. The two responses are correlated, that is to say a detected azimuthal position is ascribed to the rotor position for which it was detected. The applicable detected values for both the azimuthal position and the rotor position can be detected by sensors and thus measured.

Alternatively, the checking step 404 and the detection step 406 can also be swapped by continually performing the detection, that is to say measurement, and then checking the detection prerequisites according to the checking step 404. If these are not met, the subsequent evaluation would no longer be performed, at any rate not with the data that were recorded for detection prerequisites that have not been met.

According to the variant illustrated in FIG. 4, after the detection step 406 the method continues with the filter step 408. The filter step 408 comprises filtering, in particular averaging, all recorded azimuthal positions relating to a respective rotor position. That is to say that only the values that were recorded under detection prerequisites that have been met are filtered.

The result of the filter step 408 can therefore be the averaged signal response 312 shown in FIG. 3B. The result fundamentally becomes better the more values were recorded per rotor position, that is to say the more values are used for the averaging or filtering. To this end, the detection and filtering are repeated, in each case while checking the detection prerequisites. This is indicated by the repetition loop 410. The repetition loop can be based on a predetermined number of repetitions or on a number of revolutions of the rotor to be performed. A precedable check such as this is not shown in the flowchart 400 in FIG. 4 for the sake of simplicity.

The repetition loop 410 should also be understood to be essentially symbolic. There is also the possibility of the detection step 406 running continuously and recording values for one rotor revolution after the other. The checking step 404 concurrently checks whether the detection prerequisites are met, and this is performed for a predeterminable number of rotor revolutions, for example over 1000 or 2000 revolutions.

Should the checking step 404, whether it now precedes or succeeds the detection step 406, detect that a detection prerequisite is not met, in particular because an azimuth adjustment has been made, the method does not need to be terminated. In this case, it can suffice if the detected values that were detected while the detection prerequisites were not met are ignored. If excessively great variances in the operating point of the wind power installation arise, however, there is also the possibility of terminating the method.

In any case, following sufficient repetition, if a sufficiently well averaged or filtered signal response of the azimuthal position has been ascertained in the filter step 408, the method can transfer this averaged signal response to the 1P computation step 412.

In the 1P computation step 412, the averaged signal response, which can correspond to the averaged signal response 312 in FIG. 3B, is used to compute a 1P component that can correspond to the 1P signal component 314 in FIG. 3B.

This 1P signal component can then be evaluated in the evaluation step 414. To this end, the evaluation step 414 can receive the 1P signal component that was computed in the 1P computation step 412. To this end, it suffices for the amplitude and phase of the 1P component to be transferred from the 1P computation step 412 to the evaluation step 414.

The evaluation step 414 can comprise determining a blade misposition Aa from predetermined tables on the basis of the 1P component.

The following features may be implemented in one or more embodiments.

A method can have the following steps:

Checking whether a currently prevailing installation operating situation is suitable for detecting a rotor imbalance. An assumed suitable operating situation is a feed-in mode in which the installation is operated in the partial load range without there being alignments to track the wind, or other active movements of the azimuth system, or active displacement of the blade adjustment system. Furthermore, a minimum rotor speed is required, e.g., 50% of the rated speed of the installation type, so that aerodynamic forces and centrifugal forces can be assumed to be strong compared with frictional forces.

Checking a measured variable of the azimuth system for change.

Recording the rotor position at which the observed change in the azimuthal position has occurred.

Recording the number of rotor revolutions during which the measured variable was checked for change.

By way of illustration, the last three steps can be carried out as follows:
1. Checking whether the measured azimuthal position has changed since the last time step every 100 ms.
2. If a change of the azimuthal position has occurred, buffer-storing the rotor position at which this took place.
3. Recording the results from 1. and 2. in a data field. As an illustration, this can be a "check list" for each representable rotor position (from 2.). If a rotation to the right was identified in 1., a tally mark is added, and for rotations to the left a tally mark is deducted.

The further steps can then follow:

Normalizing the prevalence of observed changes with the number of observed rotor revolutions, that is to say averaging in order to get from "tally marks" to "average number of tally marks per rotor revolution", to explain it clearly.

Computing the amplitude and phase of a 1P frequency component in the normalized prevalence signal.

Optionally: regularly performing repetitions of the whole method to independently confirm earlier imbalance detections, or observe the change in the rotor imbalance over time (e.g., before/after maintenance work).

Outputting the computation result.

The method is therefore suitable for detecting rotor imbalances, in particular blade angle mispositions and mass imbalances. Mass imbalances in the rotor can also bring about an azimuthal movement. Since the rotor has its rotor sweep area a few meters in front of the tower center, and thus also in front of the azimuth bearing, circumferential centrifugal forces of an imbalance mass cause a (likewise circumferential) force on the azimuthal bearing.

The method is also suitable for drawing attention to installations that are operated with blade angle mispositions or mass imbalances. This in turn facilitates a correction, which in the case of blade angle errors is achieved by changing the zero position of the blade angle transmitter, and in the case of mass imbalances by adding supplementary masses.

A particular advantage of the present embodiments is that detection of in particular blade angle mispositions is possible with the azimuth brake closed.

The method can thus also be used with a braked azimuth system, provided that the play, that is to say slack, and the stiffness in the drive system of the azimuth system still permit slight rotational movements, and these are able to be measured.

Another advantage is: the method facilitates detection of blade angle mispositions without a precise mathematical model of the azimuth system.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for determining a blade misposition of a rotor blade of a rotor of a wind power installation having multiple rotor blades with an adjustable blade angle, the method comprising:
   detecting an azimuthal movement of a nacelle of the wind power installation, the nacelle having a rotor and an azimuth adjustment device, the azimuth adjustment device having at least one activable azimuth actuator configured to adjust an azimuthal position of the nacelle, wherein the detecting of the azimuthal movement of the nacelle occurs while the at least one azimuth actuator is inactive; and
   determining the blade misposition on the basis of the detected azimuthal movement,
   wherein the blade misposition describes a blade angle variance of the blade angle of the rotor blade from a reference blade angle,
   wherein a circumferential rotational position of the rotor is referred to as the rotor position,
   wherein a recorded azimuth response is evaluated by recording an integral over the recorded azimuth response, and
   wherein the integral is used to determine an amplitude of an assumed sinusoidal azimuth response.

2. The method according to claim 1, wherein determining the blade misposition includes operating an azimuth locking brake to prevent the azimuthal position from being adjusted.

3. The method according to claim 1, further comprising:
   checking whether one, multiple or all detection prerequisites are met from the list comprising:
      the at least one azimuth actuator is inactive;
      an azimuth locking brake has been operated; and
      a pitch device for adjusting the blade angles is inactive, wherein the rotor has at least one predeterminable minimum detection speed.

4. The method according to claim 3, wherein the at least one minimum detection speed is at least 25% of a rated speed of the rotor.

5. The method according to claim 3, wherein the at least one minimum detection speed is at least 40% of a rated speed of the rotor.

6. The method according to claim 1, wherein:
the azimuthal movement is detected by detecting the azimuth response dependent on the rotor position as the response of the azimuthal position, and
characteristics of the recorded azimuth response are used to determine the blade misposition.

7. The method according to claim 1, wherein:
to record the azimuth movement, an azimuth position relative to a corresponding rotor position is recorded in an azimuth curve, and
to determine the blade misalignment, the azimuth curve is evaluated as a function of a rotor position.

8. The method according to claim 1, wherein:
the recorded azimuth response is used to compute a 1P component, wherein
the 1P component describes an oscillating signal with a period over one rotor revolution, and
the 1P component is taken as a basis for determining the blade misposition, wherein
the 1P component is computed using an amplitude and a phase related to the rotor position and/or
the 1P component is determined from the recorded azimuth response by using a Fourier transformation.

9. The method according to claim 1 wherein:
the recorded azimuth response is evaluated by recording an integral over half of one rotor revolution, and
the integral recorded over half of one rotor revolution is used to determine the amplitude of the assumed sinusoidal azimuth response with an assumed period length over one rotor revolution.

10. The method according to claim 1, wherein:
the recorded azimuth response is recorded over multiple rotor revolutions, and
the recorded azimuth response is used to compute an averaged azimuth response for one rotor revolution, involving averaging or otherwise filtering, for each rotor position, all respective values of the orientation response that have been recorded for this rotor position.

11. The method according to claim 10, wherein the recorded azimuth response is recorded over at least 10 revolutions.

12. The method according to claim 10, wherein the recorded azimuth response is recorded over at least 1000 revolutions.

13. The method according to claim 1, wherein:
azimuthal values as rotor-position-dependent values of the detected azimuthal movement are used to determine the blade misposition by way of comparison with azimuthal values recorded in preliminary investigations, wherein
respectively blade misposition values of the rotor blades are stored in a table for the amplitude and phase of a 1P component inferred from the detected azimuthal movement or from the recorded azimuth response.

14. The method according to claim 1, wherein:
the azimuth adjustment device has a transmission having a gear elasticity for adjusting the nacelle,
wherein the transmission is arranged between a pinion, on the one hand, which engages with a ring gear, and the azimuth actuator and/or an azimuth brake, on the other hand, with the result that
the gear elasticity permits the detected azimuthal movement when the azimuth actuator is inactive or when the azimuth brake has been operated, and/or in that
there is provision for a gear slack between the pinion and the ring gear.

15. The method according to claim 1, wherein:
at least the detecting and the determining are each repeated after a predeterminable waiting period and/or another predefinable event in order to verify a possible change in the determined blade misposition, wherein
the predeterminable waiting period is at least one month.

16. The method according to claim 15, wherein the predeterminable waiting period is at least half a year.

17. A wind power installation, configured to determine a blade misposition of a rotor blade of a rotor of the wind power installation having multiple rotor blades with an adjustable blade angle, the wind power installation comprising:
a nacelle having a rotor and an azimuth adjustment device, the azimuth adjustment device having at least one activable azimuth actuator in order to adjust an azimuthal position of the nacelle;
a detection device configured to detect an azimuthal movement of the nacelle while the at least one azimuth actuator of the detection device is inactive; and
a computing unit configured to determine the blade misposition on the basis of the azimuthal movement detected in the detection,
wherein the blade misposition describes a blade angle variance of the blade angle of the rotor blade from a reference blade angle, and
wherein a circumferential rotational position of the rotor is referred to as the rotor position,
wherein a recorded azimuth response is evaluated by recording an integral over the recorded azimuth response, and
wherein the integral is used to determine an amplitude of an assumed sinusoidal azimuth response.

18. The wind power installation according to claim 17, wherein:
the wind power installation has a control unit, and
the control unit is configured to carry out a method comprising:
detecting the azimuthal movement of the nacelle while the at least one azimuth actuator is inactive; and
determining the blade misposition on the basis of the detected azimuthal movement.

* * * * *